USO10710615B2

(12) United States Patent
Georgeson et al.

(10) Patent No.: US 10,710,615 B2
(45) Date of Patent: Jul. 14, 2020

(54) IN-MOTION HIGH-SPEED NON-DESTRUCTIVE EVALUATION FOR RAILCAR AXLES

(71) Applicant: The Boeing Company, Chicago, IL (US)

(72) Inventors: Gary E. Georgeson, Tacoma, WA (US); Morteza Safai, Newcastle, WA (US); Tyler M. Holmes, Seattle, WA (US); Scott W. Lea, Renton, WA (US); Jyani Vaddi, Bangalore (IN)

(73) Assignee: The Boeing Company, Chicago, IL (US)

( * ) Notice: Subject to any disclaimer, the term of this patent is extended or adjusted under 35 U.S.C. 154(b) by 179 days.

(21) Appl. No.: 16/000,777

(22) Filed: Jun. 5, 2018

(65) Prior Publication Data

US 2019/0367057 A1  Dec. 5, 2019

(51) Int. Cl.
*G01N 25/72* (2006.01)
*G01J 5/00* (2006.01)
*B61K 9/06* (2006.01)
*G01J 5/04* (2006.01)

(52) U.S. Cl.
CPC .............. *B61K 9/06* (2013.01); *G01J 5/0022* (2013.01); *G01J 5/041* (2013.01); *G01N 25/72* (2013.01); *G01J 2005/0033* (2013.01); *G01J 2005/0077* (2013.01); *G01J 2005/0081* (2013.01)

(58) Field of Classification Search
None
See application file for complete search history.

(56) References Cited

U.S. PATENT DOCUMENTS

| 2,906,885 | A | 9/1959 | Orthuber et al. |
| 7,724,925 | B2* | 5/2010 | Shepard ................. G01N 25/72 382/115 |
| 8,287,183 | B2* | 10/2012 | Shepard ................. F01D 5/187 374/43 |
| 9,194,831 | B2* | 11/2015 | Traxler ................... G01N 25/72 |
| 9,752,993 | B1 | 9/2017 | Thompson et al. |
| 9,905,014 | B2* | 2/2018 | Heissenstein .......... G01N 25/72 |

(Continued)

OTHER PUBLICATIONS

Extended European Search Report prepared by the European Patent Office in Application No. 19 17 6653.4 dated Dec. 2, 2019.

(Continued)

*Primary Examiner* — Thomas R Artman
(74) *Attorney, Agent, or Firm* — McDonnell Boehnen Hulbert & Berghoff LLP

(57) ABSTRACT

An example system for inspecting railcar axles includes a flash source, an infrared camera, and a trigger sensor. The flash source is configured to apply a thermal pulse toward a surface of a railcar axle of a railcar wheelset, while the railcar wheelset is on a track. The infrared camera is configured to capture infrared data indicative of a thermal response of the surface of the railcar axle to the thermal pulse. The trigger sensor is configured to trigger the flash source to apply the thermal pulse based on a position of the railcar wheelset on the track. The example system can also include a processor configured to determine whether the captured infrared data is indicative of a crack on the surface of the railcar axle, and a vision camera configured to capture an image of the surface of the railcar axle.

20 Claims, 12 Drawing Sheets

(56) References Cited

U.S. PATENT DOCUMENTS

| | | | | |
|---|---|---|---|---|
| 2005/0008215 A1* | 1/2005 | Shepard | ............... | G01N 25/72 |
| | | | | 382/141 |
| 2010/0100275 A1 | 4/2010 | Mian et al. | | |
| 2011/0235672 A1* | 9/2011 | Shepard | ............... | F01D 5/187 |
| | | | | 374/45 |
| 2013/0077650 A1* | 3/2013 | Traxler | ............... | G01N 25/72 |
| | | | | 374/5 |
| 2015/0339830 A1* | 11/2015 | Heissenstein | ......... | G01N 25/72 |
| | | | | 348/90 |
| 2019/0367057 A1* | 12/2019 | Georgeson | ............ | B61L 23/00 |

OTHER PUBLICATIONS

Balageas et al., The thermographic signal reconstruction method: a powerful tool for the enhancement of transient thermographic images, Conference Paper in Biocybernetics and Biomedical Engineering, Jul. 2013, available at https://www.researchgate.net/publication/248706871.

Rudlin et al., Inspection of the exposed areas of rail axles using alternating currents and thermography, The British Institute of Non-Destructive Testing, 2012, available at http://www.bindt.org/downloads/ndt2012_1c1.pdf.

Rudline et al., New Methods of Rail Axle Inspection and Assessment, 18th World Conference on Nondestructive Testing, Apr. 16-20, 2012, Durban, South Africa.

\* cited by examiner

IN-MOTION HIGH-SPEED NON-DESTRUCTIVE EVALUATION FOR RAILCAR AXLES

FIELD

The present disclosure relates generally to thermographic inspection, and more particularly, to inspection of railcar axles using flash infrared thermography (IRT).

BACKGROUND

Flash IRT is a thermal transient technique that uses a flash source, an infrared camera, and an image processor to analyze a structure. In one approach, one or more short pulses of high thermal energy are applied to a thermally-conductive surface of a structure using a flash source. An infrared camera is then used to monitor and record thermal transients of the surface as heat disperses into the structure and the surface returns to its normal temperature. For instance, an infrared camera can be used to capture images of the surface before and after the pulses are applied.

Further, the images can then be analyzed using various image processing techniques in order to discriminate between different features and materials. In practice, material imperfections, such as voids, delaminations, or cracks, can affect the cooling of the surface by causing an area of the surface to cool down faster or slower relative to other areas of the surface. Image processing algorithms can analyze a sequence of images and enhance the contrast of relatively warm (or cold) spots on the surface, which may be indicative of material imperfections. Further, image processing algorithms can also be used to assist in the evaluation and/or characterization of any anomalous cooling behavior.

Railcar axles of railcar wheelsets are important components of modern railcars, and are designed to withstand large amounts of stress. However, over time, railcar axles can sometimes experience failures resulting from axle fatigue. In some cases, a crack can form on the surface of a railcar axle, weakening the strength of the railcar axle. If the crack is undetected, the crack can lead to a failure, such as an axle fracture. Accordingly, there is a need to identify surface cracks on railcar axles, in order to repair or replace them before failures occur.

Various approaches to detecting surface cracks on railcar axles exist. As one example, ultrasonic inspection can be used to inspect a surface of a railcar axle. As another example, an inspector can apply a liquid dye to a surface of a railcar axle, and observe the penetration of the liquid dye into the surface.

SUMMARY

In one example, a system for inspecting railcar axles is described. The system includes a flash source, an infrared camera, and a trigger sensor. The flash source is configured to apply a thermal pulse toward a surface of a railcar axle of a railcar wheelset, while the railcar wheelset is on a track. The infrared camera is configured to capture infrared data indicative of a thermal response of the surface of the railcar axle to the thermal pulse. The trigger sensor is configured to trigger the flash source to apply the thermal pulse based on a position of the railcar wheelset on the track.

In another example, a system for inspecting railcar axles is described. The system includes a plurality of flash infrared thermography (IRT) units positioned along a track, and a processor. Each flash IRT unit of the plurality of flash IRT units includes a flash source and an infrared camera. Each flash IRT unit of the plurality of flash IRT units is positioned at a respective position and configured to capture infrared data indicative of a surface of a respective sector of a railcar axle of a railcar wheelset. The processor is configured to determine whether any of the captured infrared data is indicative of a crack on the surface of any sectors of the railcar axle.

In another example, a method of inspecting railcar axles is described. The method includes applying, using a flash source, a thermal pulse toward a surface of a railcar axle of a railcar wheelset, while the railcar wheelset is on a track. The method also includes capturing, using an infrared camera, infrared data indicative of a thermal response of the surface of the railcar axle to the thermal pulse. Further, the method includes determining, by a processor, whether the captured data is indicative of a crack on the surface of the railcar axle.

The features, functions, and advantages that have been discussed can be achieved independently in various embodiments or may be combined in yet other embodiments further details of which can be seen with reference to the following description and figures.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying figures, wherein:

DETAILED DESCRIPTION

Figure 1:
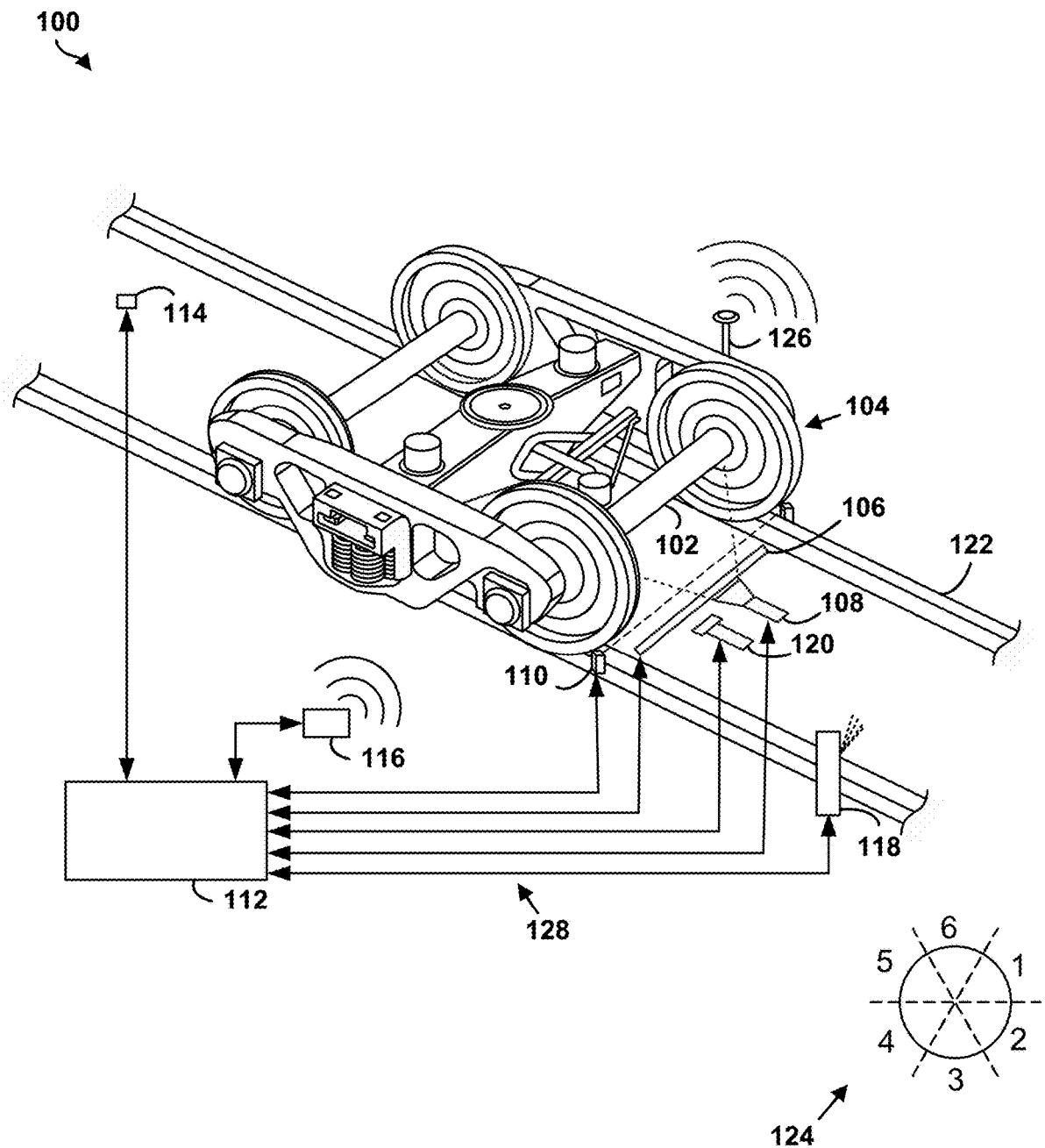
FIG. 1 conceptually illustrates an example system, according to an example embodiment.

Disclosed embodiments will now be described more fully hereinafter with reference to the accompanying figures, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

Within examples, systems and methods for inspecting railcar axles are described. In some examples, the systems and methods may facilitate inspecting railcar axles for cracks in-situ, in other words, while a railcar wheelset including the railcar axle is on a track. Further, the systems and methods can be used to inspect the railcar axle for cracks, while the wheelset is rolling on the track.

An example system includes a flash source, an infrared camera, and a trigger sensor. The flash source can be configured to apply a thermal pulse toward a surface of a railcar axle of a railcar wheelset, while the railcar wheelset is on a track. Further, the infrared camera can be configured to capture infrared data indicative of a thermal response of the surface of the railcar axle to the thermal pulse. The flash source and the infrared camera can be positioned beneath a height at which the railcar axle rotates above the track. With this arrangement, the flash source can apply the thermal pulse, and the infrared camera can record the thermal response, from below the railcar axle. The trigger sensor can trigger the flash source to apply the thermal pulse based on a position of the railcar wheelset on the track. For instance, the trigger sensor can include a proximity sensor that can be triggered based on a proximity of a wheel of a railcar wheelset to the proximity sensor.

The systems described herein can also include one or more processors configured to process infrared data captured by the infrared camera and determine whether the infrared data is indicative of a crack on the surface of the railcar axle. If the surface of the railcar axle includes a crack, the captured infrared data may include data indicative of the presence of the crack. For instance, since a crack is an area where material is missing on the surface, the crack may appear in the captured data as an area that is cooler relative to surrounding areas on the surface. A processor or group of processors can be configured to identify these cooler areas as possible cracks. Cracks on the surface may also be detectable in this manner when dirt or other substances are present on the surface of the railcar axle.

If a potential crack is identified, the railcar axle, or the railcar wheelset including the railcar axle, can be flagged for further inspection. In one approach, an identifier such as a radio-frequency identifier corresponding to the railcar wheelset can be stored in a memory along with the captured data or a representation of the captured data. Additionally or alternatively, a marking tool can apply a visible marking to the railcar wheelset upon determining that the captured infrared data is indicative of a crack on the surface of the railcar axle.

In some examples, multiple flash IRT units can be positioned along a track, with each flash IRT unit including a flash source and an infrared camera. The flash IRT units can be positioned at respective positions and configured to capture infrared data indicative of a surface of a respective sector of a railcar axle of a railcar wheelset. For instance, four IRT units could be configured to capture data indicative of four, ninety-degree sectors, respectively, as the railcar wheelset rolls on the track. For each revolution, the railcar axle covers a distance equal to the circumference of the wheels of the railcar wheelset. For example, a wheel having a diameter of one meter moves approximately 3.14 meters per revolution. Accordingly, four IRT units could be arranged within a distance of 3.14 meters in order to capture infrared data indicative of an entire surface of a railcar axle having wheels with a diameter of one meter.

The systems and methods described herein also have benefits over other inspection systems and methods. Because of the rapid measurement capability, as well as the ability to function without physically contacting the railcar axle, the systems described herein are well-suited for in-motion crack detection for in-situ railcar axles. In addition, the systems described herein can be more cost effective to manufacturer and implement. Using ultrasonic inspection would be more complicated, slower, and less cost-effective, owing to the need to position an ultrasonic array against the surface of a railcar axle and then retract the ultrasonic array away from the railcar axle before the wheelset advances on the track. Similarly, using approaches that include liquid dye penetrants would also be more complicated and slower, due to the time needed to apply the liquid dye to the surface and the complexity of doing so.

Further, the systems described herein, and associated methods, are different than performing other thermal imaging techniques due to the challenges presented by inspecting a railcar axle while the railcar wheelset is on a track. At, for example, ten miles per hour, a one-meter railcar axle travels a distance of about five meters per second. The challenge is to synchronize operation of a flash source and an infrared camera with this movement of the railcar axle. Triggering the flash source and/or the infrared camera based on a position of the railcar wheelset on the track can help address this challenge. In addition, the flash source and the infrared camera can be mounted beneath a height at which the railcar axle rotates above the track, so that the system can function while the railcar wheelset is on the track and the railcar axle rolls over the system. This allows the system to function without having to remove a railcar wheelset from a track. In addition, multiple infrared flash thermography (IRT) units can be positioned a long a track, in order to capture infrared data indicative of the surface of multiple sectors of a railcar wheelset.

Various other features of the example systems discussed above, as well as methods for inspecting a surface of a railcar axle using these systems, are also described hereinafter with reference to the accompanying figures.

Referring now to the figures, FIG. 1 is a conceptual illustration of an example system 100. In line with the discussion above, the system 100 may be used to inspect a surface, such as a surface of a railcar axle 102 of a railcar wheelset 104. As shown in FIG. 1, system 100 includes a flash source 106, an infrared camera 108, a trigger sensor 110, a processor 112, a speed sensor 114, an RFID reader 116, a marking tool 118, and a vision camera 120.

Flash source 106 can be configured to apply a thermal pulse toward a surface of railcar axle 102 while railcar wheelset 104 is on a track 122. Flash source 106 can include a housing, a lighting element, and one or more reflectors. In one example, flash source 106 can include or take the form of a flash lamp. Flash source 106 can be a linear flash source that is arranged parallel to a longitudinal axis of railcar axle 102, and perpendicular to track 122. Flash source 106 can be configured to convert energy stored in a capacitor (not shown), or bank of capacitors, into the thermal pulse.

As shown in FIG. 1, flash source 106 can be positioned beneath a height at which the railcar axle 102 rotates above track 122. With this arrangement, flash source 106 can illuminate part of a surface of railcar axle 102 from below railcar axle 102 while railcar axle 102 is on track 122. In some examples, flash source 106 can apply the thermal pulse to the surface of one of a plurality of sectors of railcar axle 102. Diagram 124 illustrates six example sectors of railcar axle 102. The number of sectors could vary depending on the desired implementation. For instance, the number of sectors could instead be three, four, or five.

Further, flash source 106 can be configured to apply the thermal pulse while railcar wheelset 104 is rolling on the track. For instance, flash source 106 can be configured apply the thermal pulse while railcar wheelset is rolling on the track at a speed that is greater than five miles per hour (mph) or at a speed that is greater than ten mph. This can include, for example, a speed between 10 mph and 20 mph.

Infrared camera 108 can be configured to capture infrared data indicative of a thermal response of the surface of railcar axle 102 to the thermal pulse. For instance, infrared camera 108 can be configured to capture one or more images before the thermal pulse is applied and one or more images after the thermal pulse is applied. The images captured by infrared camera 108 could be indicative of the thermal response during a brief window of time, such as a few microseconds or tens of microseconds. In line with the discussion above, if the surface of railcar axle 102 includes a crack, the crack can cause a portion of the surface to be cooler than surrounding areas on the surface. Infrared camera 108 can capture infrared data that reflects this temperature anomaly.

Like flash source 106, infrared camera 108 can be positioned beneath a height at which the railcar axle 102 rotates above track 122. With this arrangement, flash source 106 can image part of a surface of railcar axle 102 from below railcar axle 102 while railcar axle 102 is on track 122. In some examples, infrared camera 108 can image one of a plurality of sectors of railcar axle 102.

Further, infrared camera 108 can be configured to image the surface of railcar axle 102, while railcar wheelset 104 is rolling on the track. For instance, infrared can be configured image the surface of railcar axle 102, while railcar wheelset is rolling on the track at a speed that is greater than five mph or at a speed that is greater than ten mph. This can include, for example, a speed between 10 mph and 20 mph.

Trigger sensor 110 can be configured to trigger flash source 106 to apply the thermal pulse based on a position of railcar wheelset 104 on track 122. For instance, trigger sensor 110 can be configured to trigger flash source 106 to apply the thermal pulse upon detection of railcar wheelset 104, or upon detection of railcar wheelset 104 and expiration of a delay time. In one example, trigger sensor 110 can take the form of or include a proximity sensor. The proximity sensor could be configured to emit an electromagnetic field and look for changes in the electromagnetic field or return signal. The proximity sensor could alternatively include an emitter and a receiver positioned on opposite sides of a track. When railcar wheelset 104 passes between the emitter and the receiver, the proximity sensor could detect the presence of railcar wheel set 104.

In some examples, trigger sensor 110 can trigger flash source 106 to apply the thermal pulse by providing a trigger signal directly to flash source 106. Alternatively, trigger sensor 110 can trigger flash source 106 to apply the thermal pulse by providing a trigger signal or instruction to processor 112, which causes processor 112 to cause flash source 106 to apply the thermal pulse.

In one example, trigger sensor 110 can also be configured to trigger infrared camera 108 to capture the infrared data based on a position of railcar wheelset 104 on track 122. For instance, trigger sensor 110 can be configured to trigger infrared camera 108 to capture the infrared data upon detection of railcar wheelset 104, or upon detection of railcar wheelset 104 and expiration of a delay time. Trigger sensor 110 can trigger infrared camera 108 to capture the infrared data by providing a trigger signal directly to infrared camera 108. Alternatively, trigger sensor 110 can trigger infrared camera 108 to capture the infrared data by providing a trigger signal to processor 112, which causes processor 112 to cause infrared camera 108 to capture the infrared data.

Speed sensor 114 can be configured to determine a speed of railcar wheelset 104. Speed sensor 114 could include a laser rangefinder, for example.

RFID reader 116 can be configured to determine an identifier associated with railcar wheelset 104. For instance, an RFID tag 126 could be attached to railcar wheelset 104 or attached to a railcar including railcar wheelset 104, and RFID reader 116 could be configured to identify an identification code stored by RFID tag 126.

Marking tool 118 can be configured to apply a visible marking to railcar wheelset 104. For instance, marking tool can be configured to spray a visible marking onto a portion of railcar wheelset 104.

Vision camera 120 can be configured to capture visual images of the surface of railcar axle 102. The visual images of the surface of railcar axle 102 can be stored in a memory for subsequent review by an inspector if processor 112 determines that the captured infrared data is indicative of a crack on the surface of railcar axle 102.

In some examples, visual images of the surface of the railcar axle 102 can be overlaid with or shown adjacent to infrared images captured by infrared camera 108 to assist an operator in determination of damage. By way of example, a first infrared image of the surface of a first sector of the railcar axle 102 can be displayed in conjunction with (e.g., at the same time as) a first visual image of the surface of the first sector of the railcar axle 102, and a second visual image of the surface of a second sector of the railcar axle 102 can be displayed in conjunction with a second visual image of the surface of the second sector of the railcar axle 102. This may allow an operator to observe a crack spanning between the surface of the first sector and the surface of the sector. Visual images and corresponding infrared images of the surface of individual sectors can be displayed individually. Alternatively, visual images and corresponding infrared images of the surface of multiple sectors can be displayed at the same time. Displaying visual images of the surface of the railcar axle 102 overlaid with or adjacent to infrared images of the surface of the railcar axle 102 can improve the ability of an operator to discriminate between cracks and non-cracks on the surface of the railcar axle 102. For instance, displaying visual images and infrared images together can lessen the number of false positives and/or false negatives.

Vision camera 120 can include one or more light emitting diodes (LEDs) configured to illuminate the surface of railcar axle 102. In one example, vision camera 120 can include a blue LED configured to illuminate the surface of railcar axle 102. Illuminating the surface of railcar axle 102 using a blue LED is advantageous because some contaminants, such as oil and grease, fluoresce when illuminated near ultraviolet wavelengths. Hence, by illuminating the surface using blue light (e.g., light having a wavelength between about 380 nanometers and 500 nanometers), contaminants on the surface may be reflected in data captured by vision camera 120, allowing an operator to more easily discriminate between cracks and surface contamination.

Processor 112 may be any type of processor, such as a microprocessor, digital signal processor, multicore processor, etc. Processor 112 can be configured to determine whether the captured infrared data is indicative of a crack on the surface of railcar axle 102. To make this determination, processor 112 could receive one or more images from infrared camera 108, and analyze the images to look for areas on the surface that are cooler relative to surrounding areas of the surface. For instance, processor 112 could be configured to look for areas that are, for example, a tenth of a degree cooler, one-half of a degree cooler, or one degree cooler than surrounding areas on the surface. Another technique for identifying colder areas is calculating thermal gradients and searching for areas having non-zero thermal gradients. Identifying colder areas could involve pre-processing the images to enhance the contrast of temperature differentials on the surface.

In some examples, processor 112 could use machine learning techniques to determine whether the captured infrared data is indicative of a crack on the surface of railcar axle 102. For instance, a machine learning model could be developed using a training set that includes images of thermal responses of surfaces of railcar axles that include cracks. Processor 112 could use the machine learning model to analyze the captured infrared data and assess whether or not the captured infrared data is indicative of a crack on the surface of railcar axle 102.

As noted above, in addition to or instead of the crack detection functions, processor 112 could be configured to perform synchronization functions. For example, processor 112 could be configured to receive a trigger signal from trigger sensor 110, and based on receiving the trigger signal, to cause flash source 106 to apply the thermal pulse and/or to cause infrared camera 108 to capture the infrared data. In one example, processor 112 could receive data from speed sensor 114 indicative of a speed of railcar wheelset 104, and determine when to trigger flash source 106 and/or infrared camera 108 using the speed of railcar wheelset 104.

In some examples, upon determining that the captured infrared data is indicative of a crack on the surface of railcar axle 102, processor 112 can store an identifier associated with railcar wheelset 104 in a memory. For example, processor 112 can determine an identifier using RFID reader 116, and store the identifier in the memory. Additionally or alternatively, upon determining that the captured infrared data is indicative of a crack on the surface of railcar axle 102, processor 112 can cause marking tool 118 to apply a visible marking to railcar wheelset 104. To facilitate the marking, processor 112 could receive data from speed sensor 114 indicative of a speed of railcar wheelset 104, and determine when to cause marking tool 118 to apply the visible marking using the speed of railcar wheelset 104.

Processor 112 could be configured to carry out any of the processor functions described herein by executing program instructions stored in a non-transitory computer-readable medium. Further, processor 112 could be part of a computing device that is connected to a network via a wired or wireless connection. In this manner, the computing device can relay the captured infrared data, the identifier of the railcar wheelset 104, and/or the visual images to another computing device.

Flash source 106, infrared camera 108, trigger sensor 110, speed sensor 114, RFID reader 116, marking tool 118, and vision camera 120 can be communicatively coupled to processor 112 via one or more wired or wireless links 128.

Figure 2:
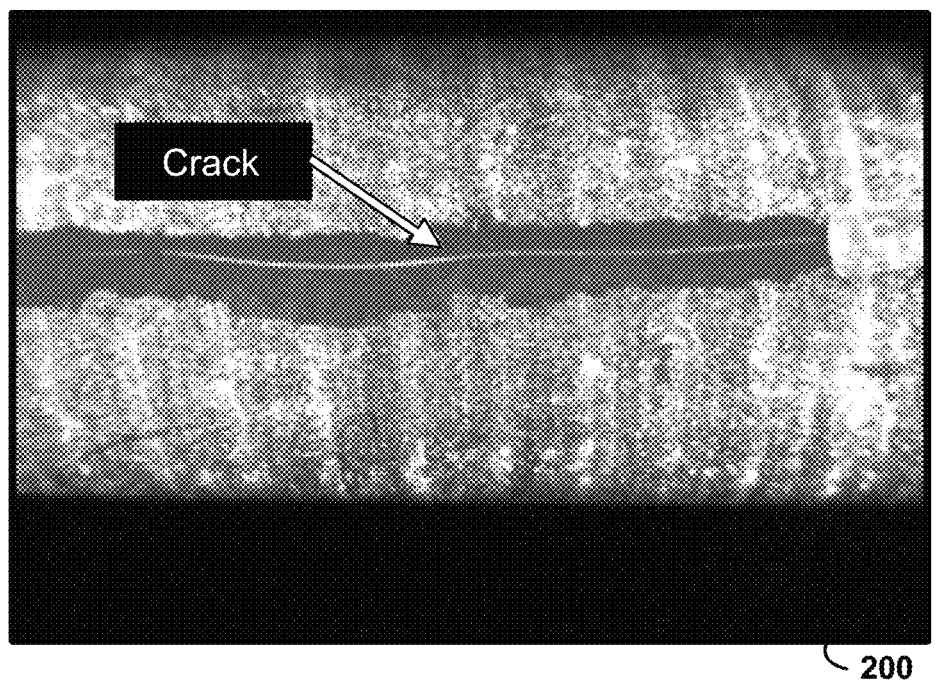
FIG. 2 illustrates an example flash infrared thermography image of a surface of a railcar axle of a railcar wheelset, according to an example embodiment.

FIG. 2 illustrates an example flash IRT image 200 of a surface of a railcar axle of a railcar wheelset. The flash IRT image 200 shows a crack on a surface of the railcar axle. The flash IRT image 200 was captured by an infrared camera at a distance of 20 inches from the surface of the railcar axle. The brightest areas in the flash IRT image 200 are indicative of the hottest spots on the surface of the railcar axles. Due to the anomalous cooling behavior described above, along the length of the crack, the temperature is not as hot as the hottest spots on the surface of the railcar axle.

In line with the discussion above, in some examples, multiple flash IRT units can be positioned along a track, with each flash IRT unit including a flash source and an infrared camera. The flash IRT units can be positioned at respective positions and configured to capture infrared data indicative of a surface of a respective sector of a railcar axle of a railcar wheelset.

Figure 3:
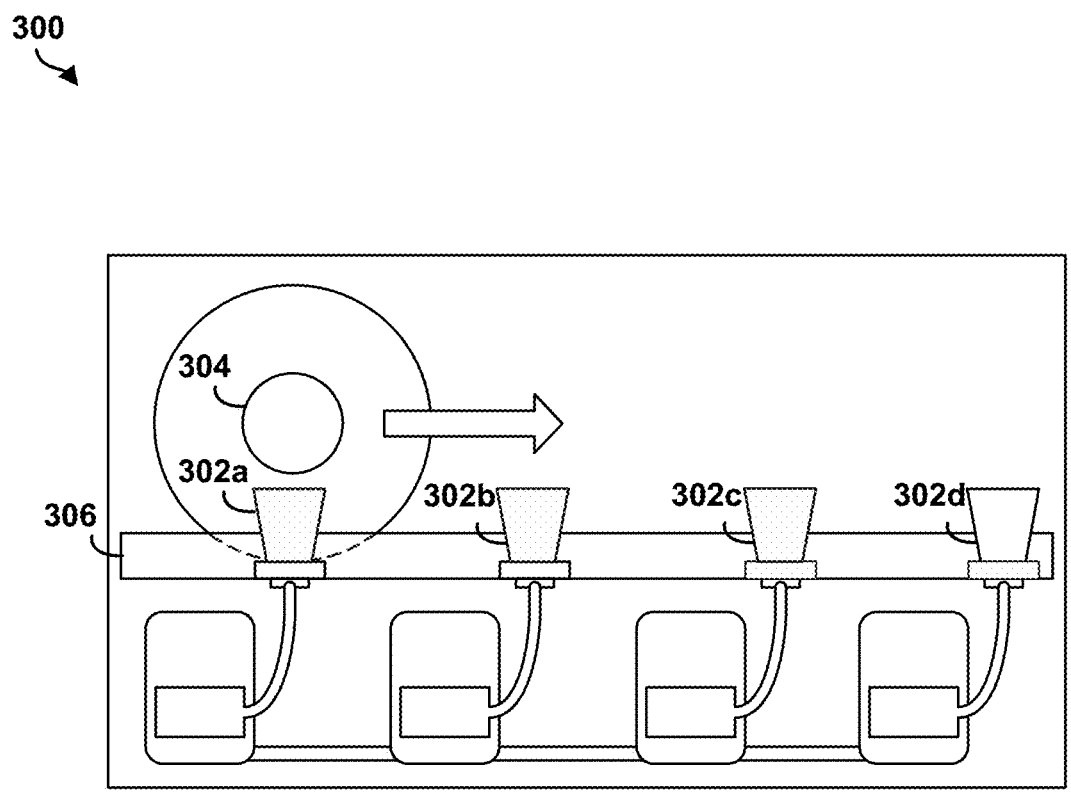
FIG. 3 illustrates an example arrangement of a plurality of flash infrared thermography units, according to an example embodiment.

By way of example, FIG. 3 illustrates an example arrangement 300 of a plurality of flash IRT units 302*a-d*. Each flash IRT unit of the plurality of flash IRT units 302*a-d* can include a flash source, such as flash source 106 of FIG. 1, and an infrared camera, such as infrared camera 108 of FIG. 1. Each flash IRT unit of the plurality of flash IRT units 302*a-d* is configured to inspect a respective quarter (in other words, a ninety-degree sector) of a surface of a railcar axle 304 of a railcar wheelset sequentially as the railcar wheelset rolls by on a track 306. For instance, a first flash IRT unit 302*a* can be configured to capture infrared data indicative of a surface of a first sector of railcar axle 304, and a second flash IRT unit 302*b* can be configured to capture infrared data indicative of a surface of a second sector of railcar axle 304 after first flash IRT unit 302*a* captures the infrared data indicative of the surface of the first sector of railcar axle 304 and railcar axle 304 rotates.

Further, each flash IRT unit 302*a-d* can be configured to capture infrared data indicative of a surface of a respective sector of railcar axle 304, while the railcar wheelset is rolling on the track. According to one approach, each flash IRT unit 302*a-d* can include a respective trigger sensor, such as trigger sensor 110 of FIG. 1, that triggers the flash IRT unit to inspect railcar axle 304 based on a position of the railcar wheelset on track 306.

In addition, infrared data captured by the plurality of flash IRT units 302*a-d* can be processed individually and/or in combination. For instance, a processor, such as processor 112 of FIG. 1, can be configured to process the infrared data captured by first flash IRT unit 302*a* to determine whether the captured infrared data is indicative of a crack on the surface of the first sector of railcar axle 304, and then process infrared data captured by second flash IRT unit 302*b* to determine whether the captured infrared data is indicative of a crack on the surface of the second sector of railcar axle 304, and so forth. Additionally or alternatively, the processor could create a composite image of the surfaces of two or more sectors of railcar axle 304, and then process the composite image to determine whether the composite image is indicative of a crack on the surfaces of the two or more sectors of railcar axle 304.

Figure 4:
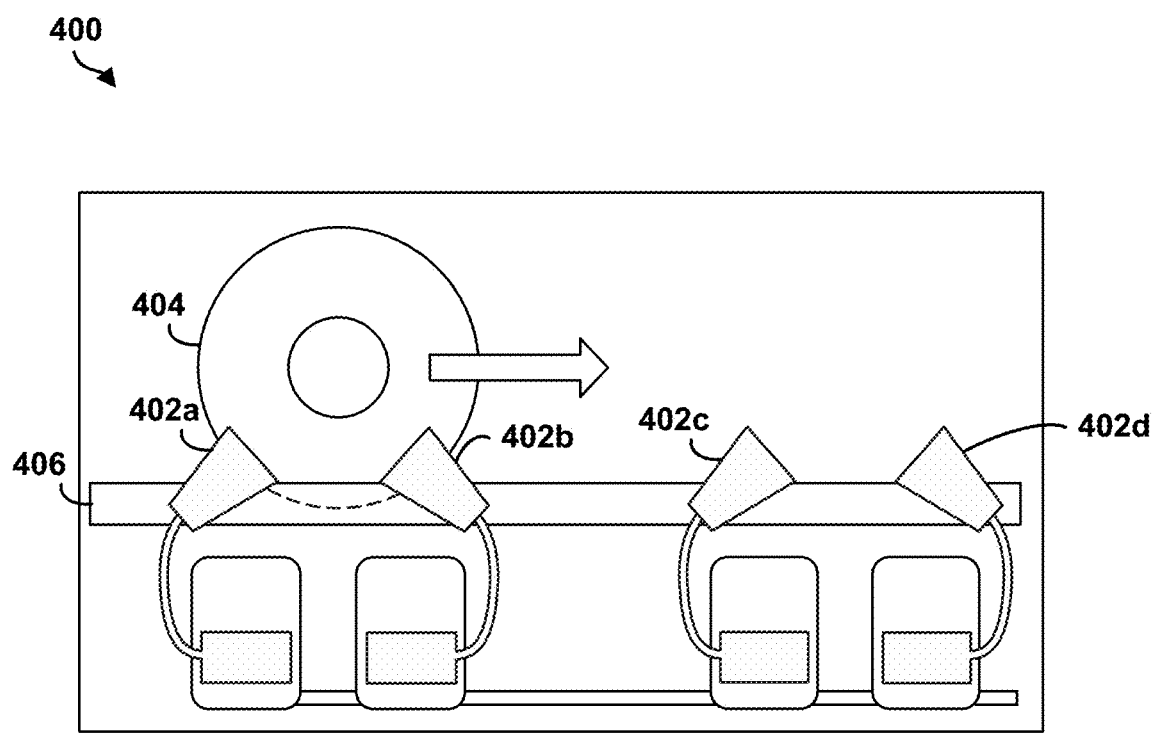
FIG. 4 illustrates another example arrangement of a plurality of flash infrared thermography units, according to an example embodiment.

FIG. 4 illustrates another example arrangement 400 of a plurality of flash IRT units 402*a-d*. Like arrangement 300 of FIG. 3, each flash IRT unit of the plurality of flash IRT units 402*a-d* can include a flash source and an infrared camera, and be configured to inspect a respective quarter (in other words, a ninety-degree sector) of a surface of a railcar axle 404 of a railcar wheelset, while the railcar wheelset is rolling on a track 406. Unlike arrangement 300 of FIG. 3, however, in arrangement 400, one half of the surface of railcar axle 404 can be inspected a time. For instance, a first flash IRT unit 402*a* is configured to capture infrared data indicative of a surface of a first sector of railcar axle 404, and a second flash IRT unit 402*b* is configured to capture infrared data indicative of a surface of a second sector of railcar axle 404, while first flash IRT unit 402*a* captures the infrared data indicative of the surface of the first sector or railcar axle 404.

One advantage of arrangement 300 over arrangement 400 is that the infrared cameras of the plurality of flash IRT units 302a-d can be placed closer to the surface of railcar axle 304, leading to better spatial resolution. On the other hand, one advantage of arrangement 400 over arrangement 300 is that a pair of flash IRT units, such as first flash IRT unit 402a and second flash IRT unit 402b can share a same flash source capacitor bank for charging and discharging. Another advantage of arrangement 400 over arrangement 300 is that a pair of flash IRT units can also share a trigger sensor.

Figure 5:
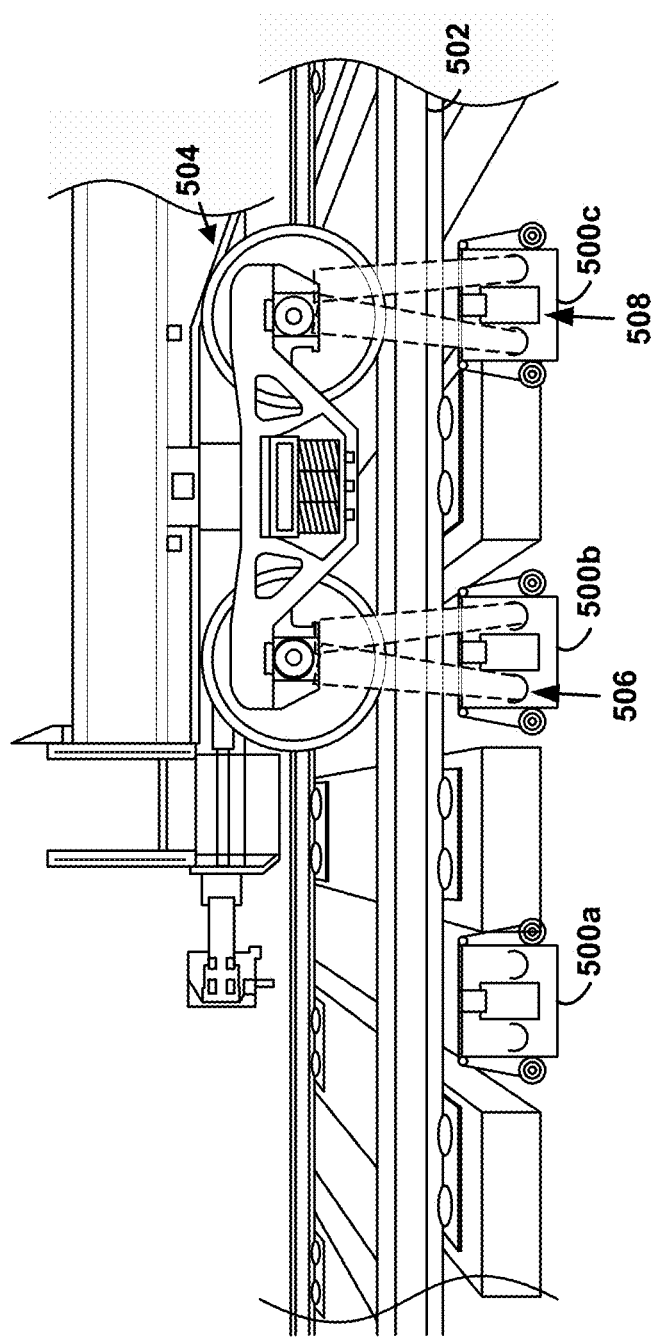
FIG. 5 illustrates a system having multiple protective chambers, according to an example embodiment.

Dirt, mud, grease, and other debris could impact the quality of infrared data captured by a flash IRT unit, such as any of the plurality of flash IRT units 302a-d of FIG. 3 or the plurality of flash IRT units 402a-d of FIG. 4. To address this issue, in some embodiments, a flash source and an infrared camera of a flash IRT unit can be provided within a protective chamber. FIG. 5 illustrates an example system having multiple protective chambers 500a-c. As shown in FIG. 5, each protective chamber of the multiple protective chambers 500a-c is arranged beneath a track 502 on which a railcar wheelset 504 rolls, and each protective chamber encapsulates at least one flash source 506 and at least one infrared camera 508.

Figure 6:
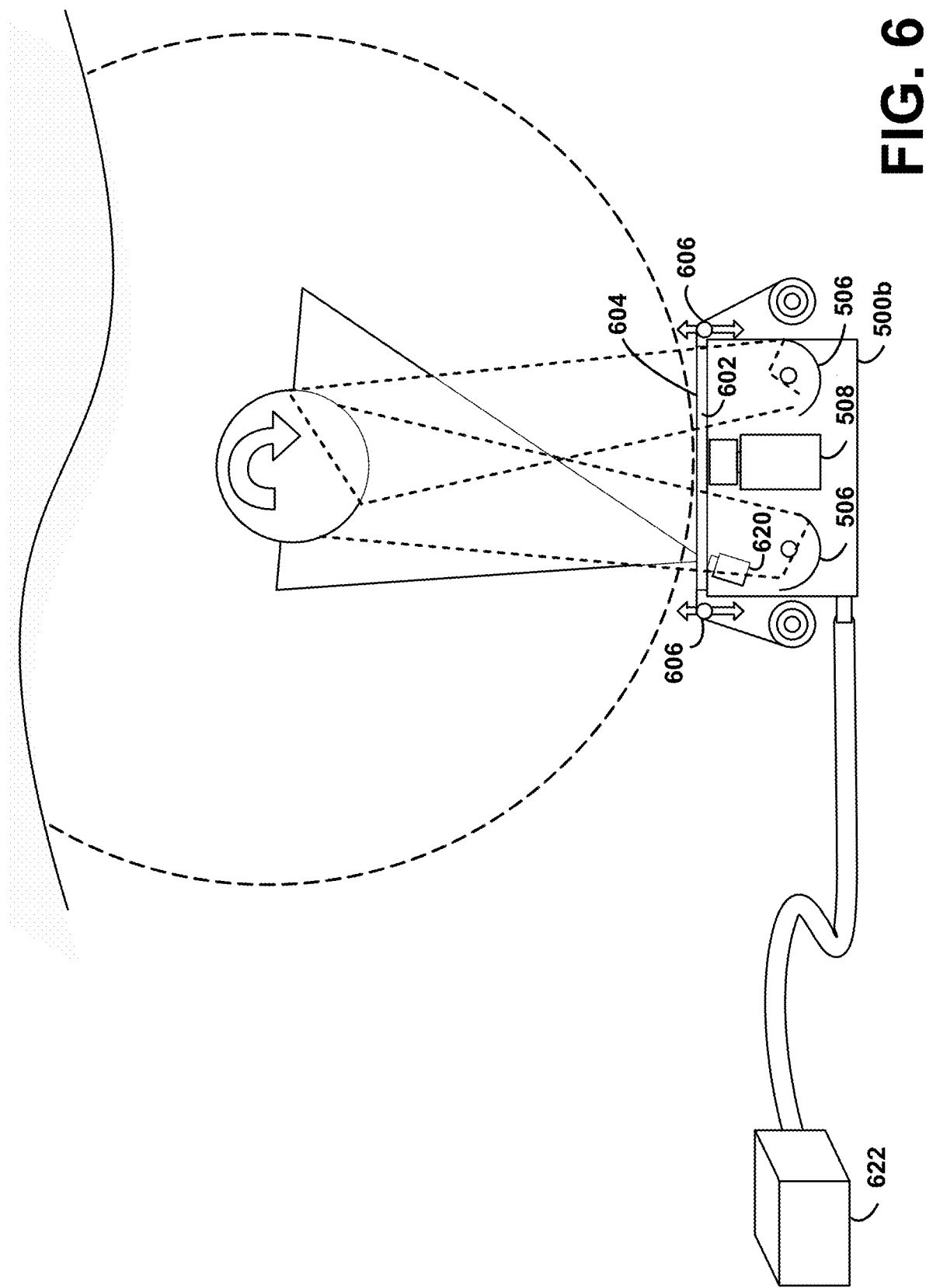
FIG. 6 illustrates a detailed view of one of the protective chambers of FIG. 5.

FIG. 6 illustrates a detailed view of protective chamber 500b of FIG. 5. As shown in FIG. 6, protective chamber 500b includes an infrared transparent window 602 through which flash sources 506 are configured to apply a thermal pulse and infrared camera 508 is configured to capture infrared data. Further, protective chamber 500b includes a protective film 604 configured to cover an exterior surface of infrared transparent window 602, and a pair of adjustable rollers 606 configured to adjust which segment of protective film 604 covers the exterior surface of infrared transparent window 602.

In one example, protective film 604 could be a cellophane film. Further, the pair of adjustable rollers 606 could be configured to periodically adjust which segment of protective film 604 covers the exterior surface of infrared transparent window 602. For instance, a processor could cause two electric motors to rotate the pair of adjustable rollers 606 clockwise by a predetermined amount, such that an old segment having debris is moved off of the exterior surface of infrared transparent window 602 and a new segment of protective film 604 that is free of debris covers the exterior surface of infrared transparent window 602.

In some examples, protective chamber 500b can encapsulate other components as well, such as a vision camera 620 and a communication module (not shown). The communication module could be configured to receive instructions for controlling any components within the protective chamber and/or the pair of adjustable rollers 606. Further, the communication module could be configured to send captured infrared data or visual images to a computing device. In some examples, the temperature and humidity within protective chamber 500b can be regulated by a heating and air conditioning system 622.

FIGS. 7A-7D illustrate example infrared images 700a-d and visual images 702a-d of a railcar axle 704 that can be displayed on a display screen 706. Display screen 706 could be a display of any type of computing device, such as a mobile device, laptop computer, desktop computer, or wearable computer. Alternatively, display screen 706 could be a television. The infrared images 700a-d can be captured using infrared cameras 708a-d and flash sources 712a-d, and the visual images can be captured using vision cameras 710a-d. Infrared cameras 708a-d can be similar to infrared camera 108 of FIG. 1. Flash sources 712a-d can be similar to flash source 106 of FIG. 1. Vision cameras 710a-d can be similar to vision camera 120 of FIG. 1.

Figure 7A:
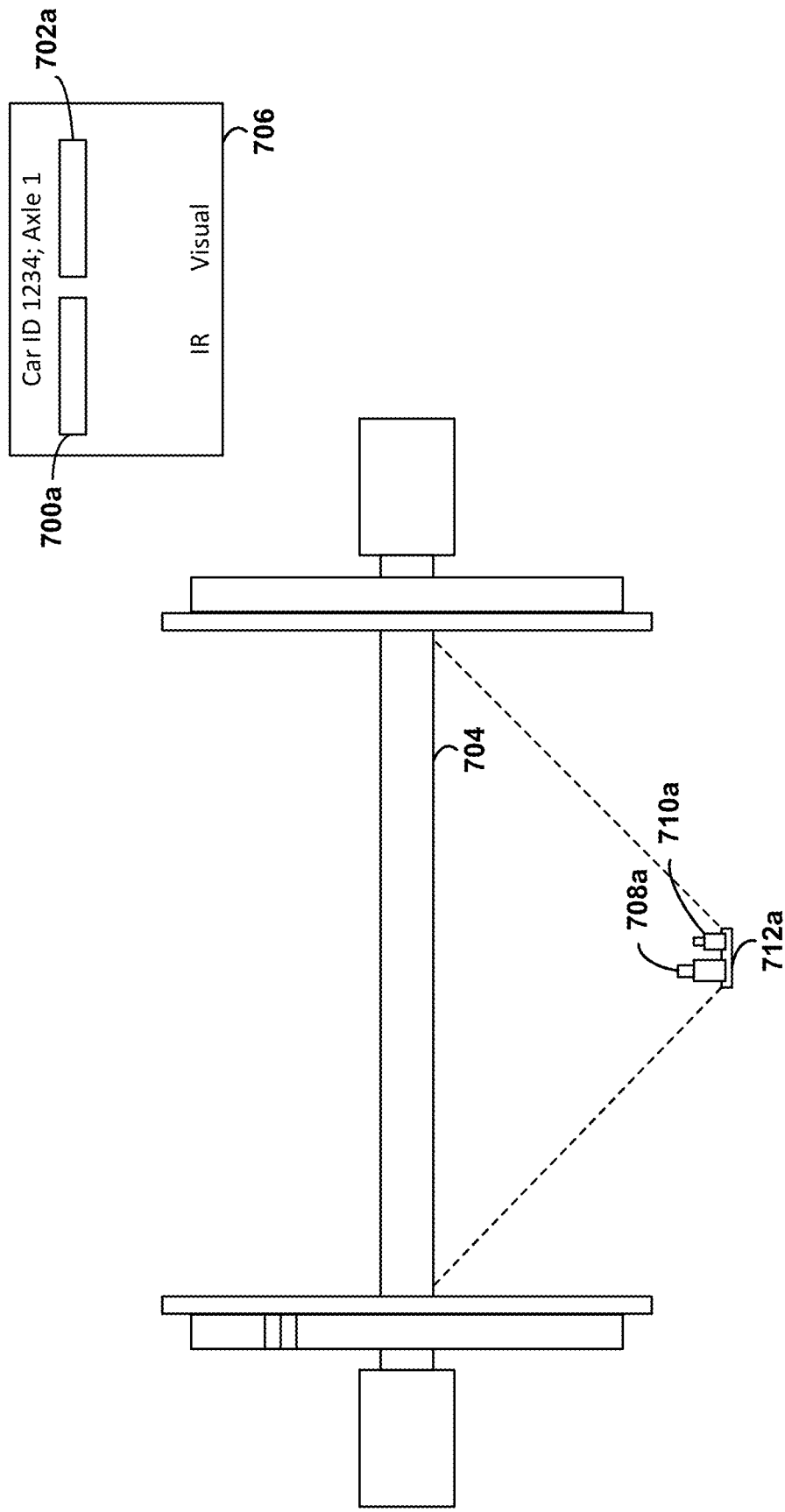
FIGS. 7A-7D illustrate example images that can be displayed on a display screen, according to an example embodiment.

As shown in FIG. 7A, at a first time period, a first infrared image 700a and a first visual image 702a of a surface of a first sector of railcar axle 704 can be displayed on display screen 706. Display screen 706 can also display an identifier of a railcar and an identifier of the railcar axle 704. First infrared image 700a and first visual image 702a do not include any indications of defects, such as a crack, on the surface of the first sector.

Figure 7B:
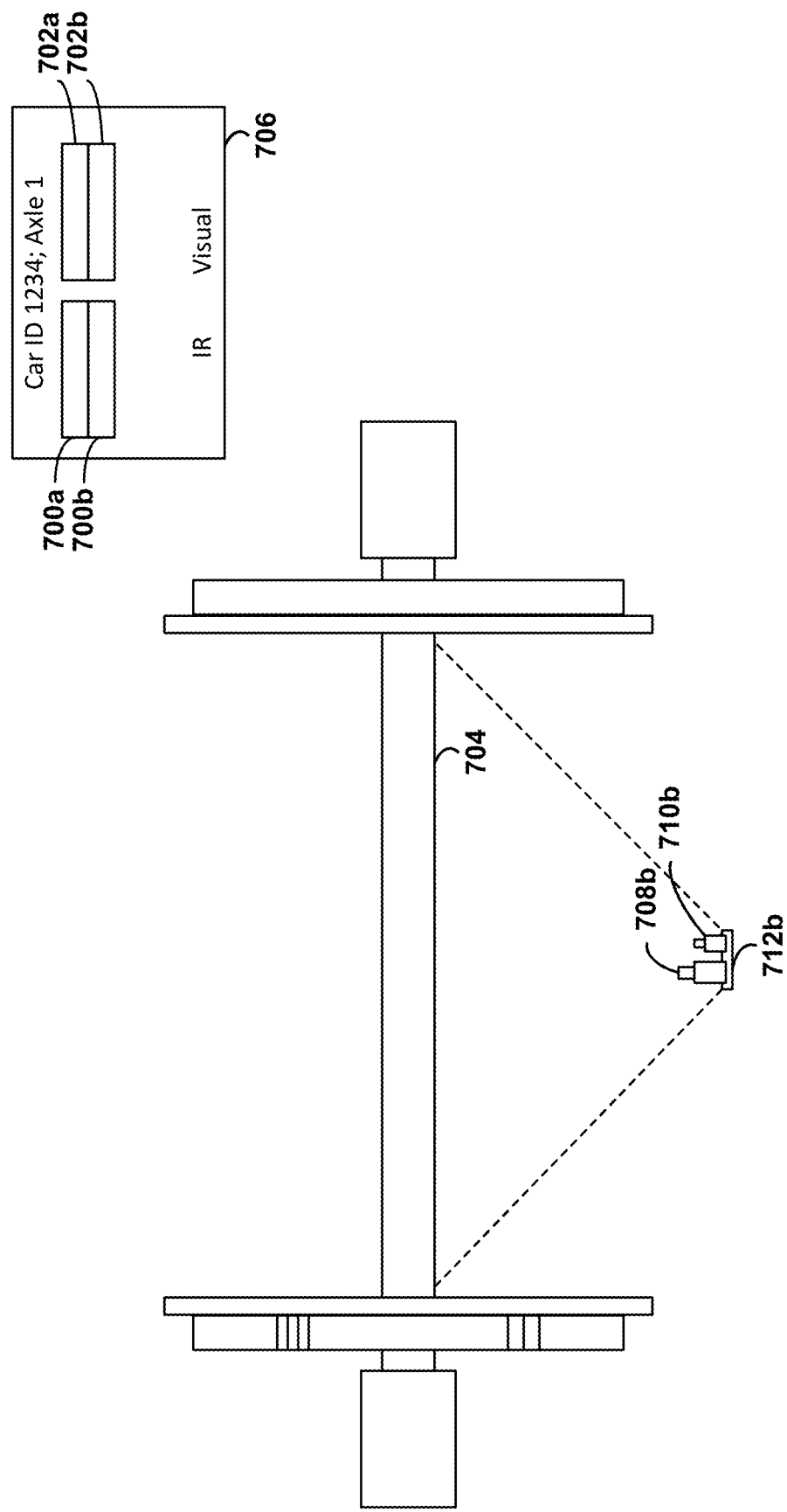

As shown in FIG. 7B, at a second time period, a second infrared image 700b and a second visual image 702b of the surface of a second sector of railcar axle 704 can be displayed on display screen 706, in addition to first infrared image 700a and first visual image 702a. Second infrared image 700b and second visual image 702b also do not include any indications of defects, such as a crack, on the surface of the second sector.

Figure 7C:
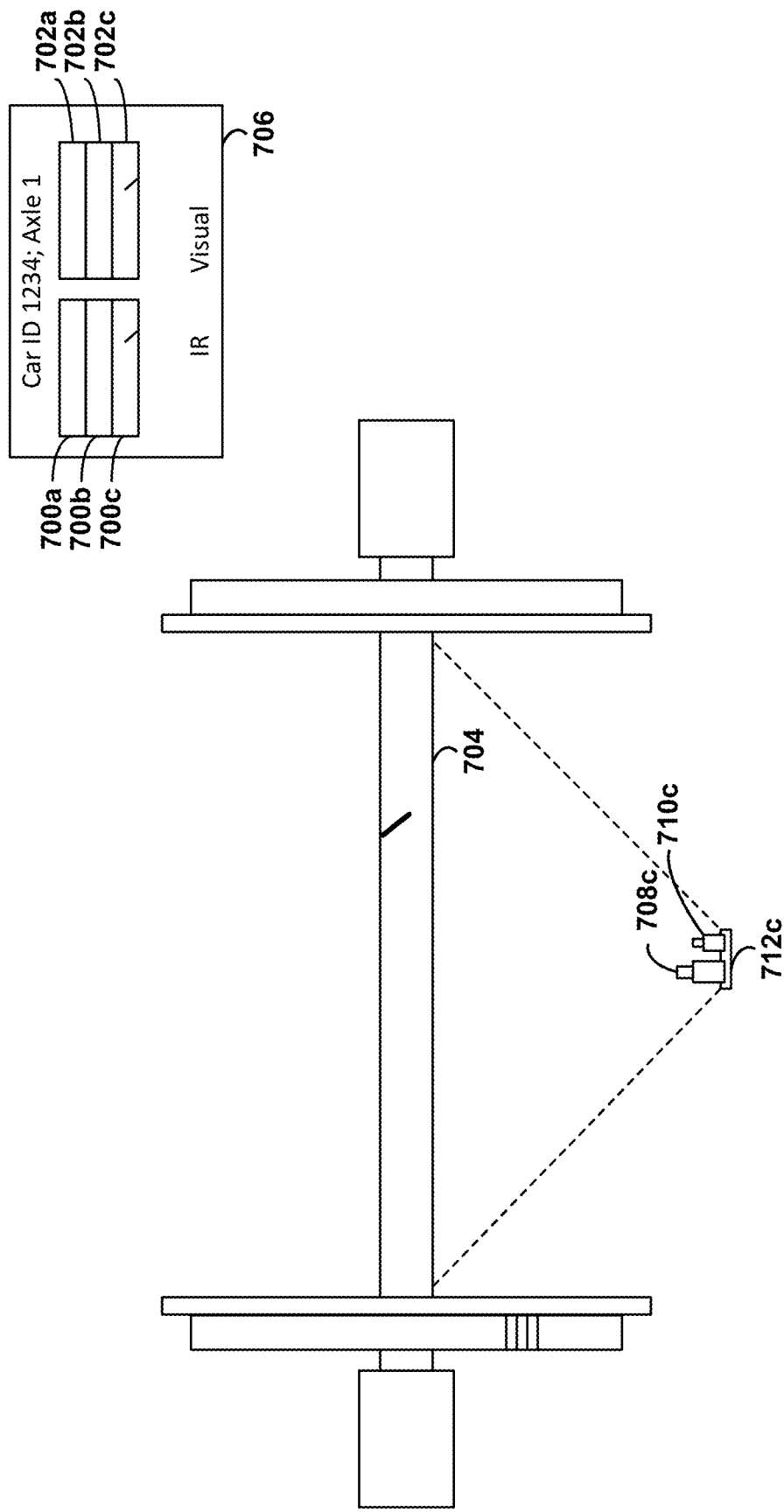

As shown in FIG. 7C, at a third time period, a third infrared image 700c and a third visual image 702c of the surface of a third sector of railcar axle 704 can be displayed on display screen 706, in addition to first infrared image 700a, second infrared image 700b, first visual image 702a, and second visual image 702b. Third infrared image 700c and third visual image 702c both include indications of a possible crack on the surface of the third sector of railcar axle 704. Viewing the third infrared image 700c and the third visual image 702c may allow an operator to confirm, by comparing third visual image 702c with third infrared image 700c, that an indication in the third infrared image 700c could be a crack.

Figure 7D:
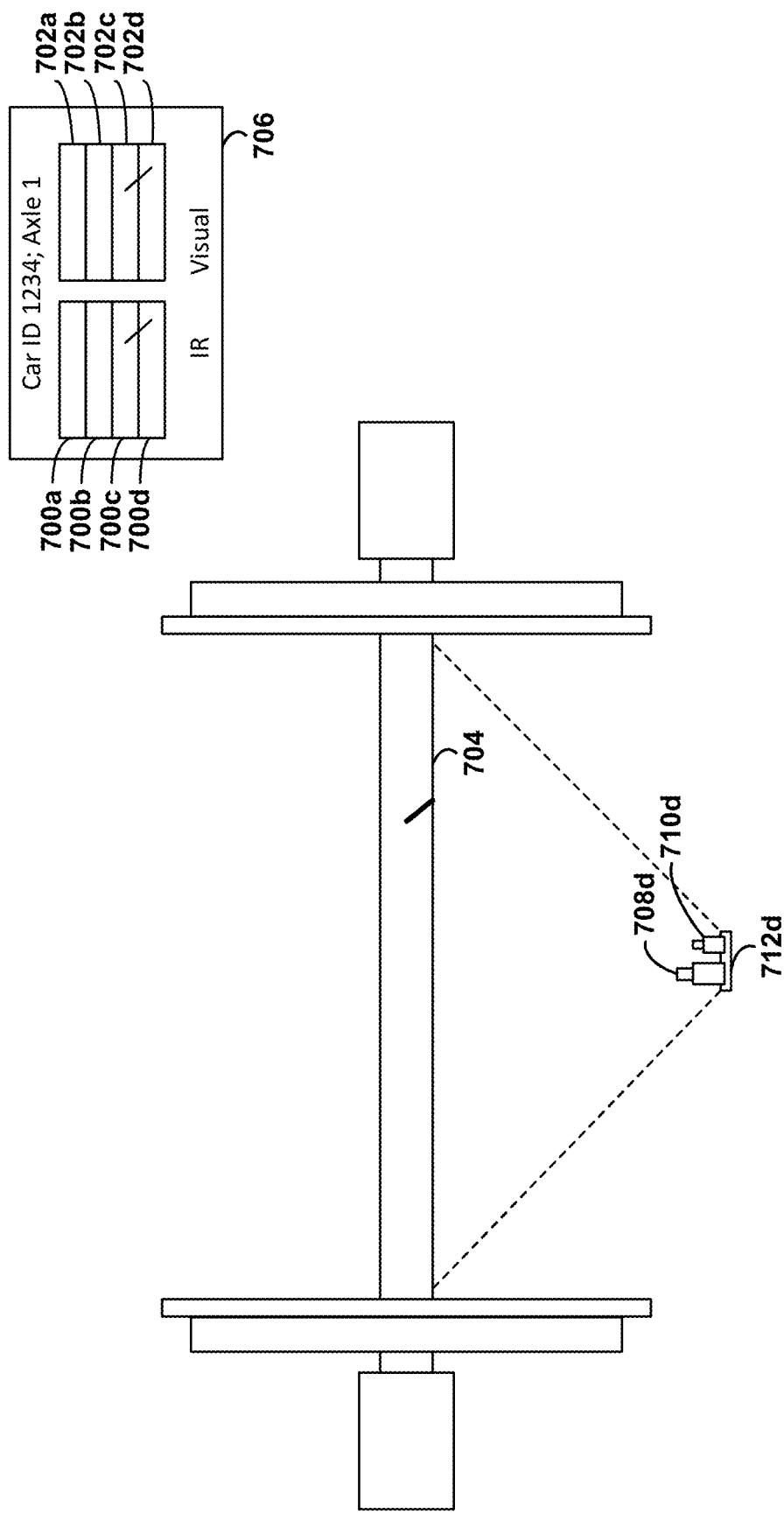

As shown in FIG. 7D, at a fourth time period, a fourth infrared image 700d and a fourth visual image 702d of the surface of a fourth sector of railcar axle 704 can be displayed on display screen 706, in addition to first infrared image 700a, second infrared image 700b, third infrared image 700c, first visual image 702a, second visual image 702b, and third visual image 702c. Fourth infrared image 700d and fourth visual image 702d both include indications of a possible crack on the surface of the fourth sector of railcar axle 704. By viewing third infrared image 700c and fourth infrared image 700d adjacent to one another, an operator can observe and determine that a possible crack spans the surfaces of the third sector and the fourth sector of railcar axle 704, thereby reinforcing the possibility that the indication in third infrared image 700c is a crack and also reinforcing the possibility that the indication in fourth infrared image 700d is also a crack.

Figure 8:
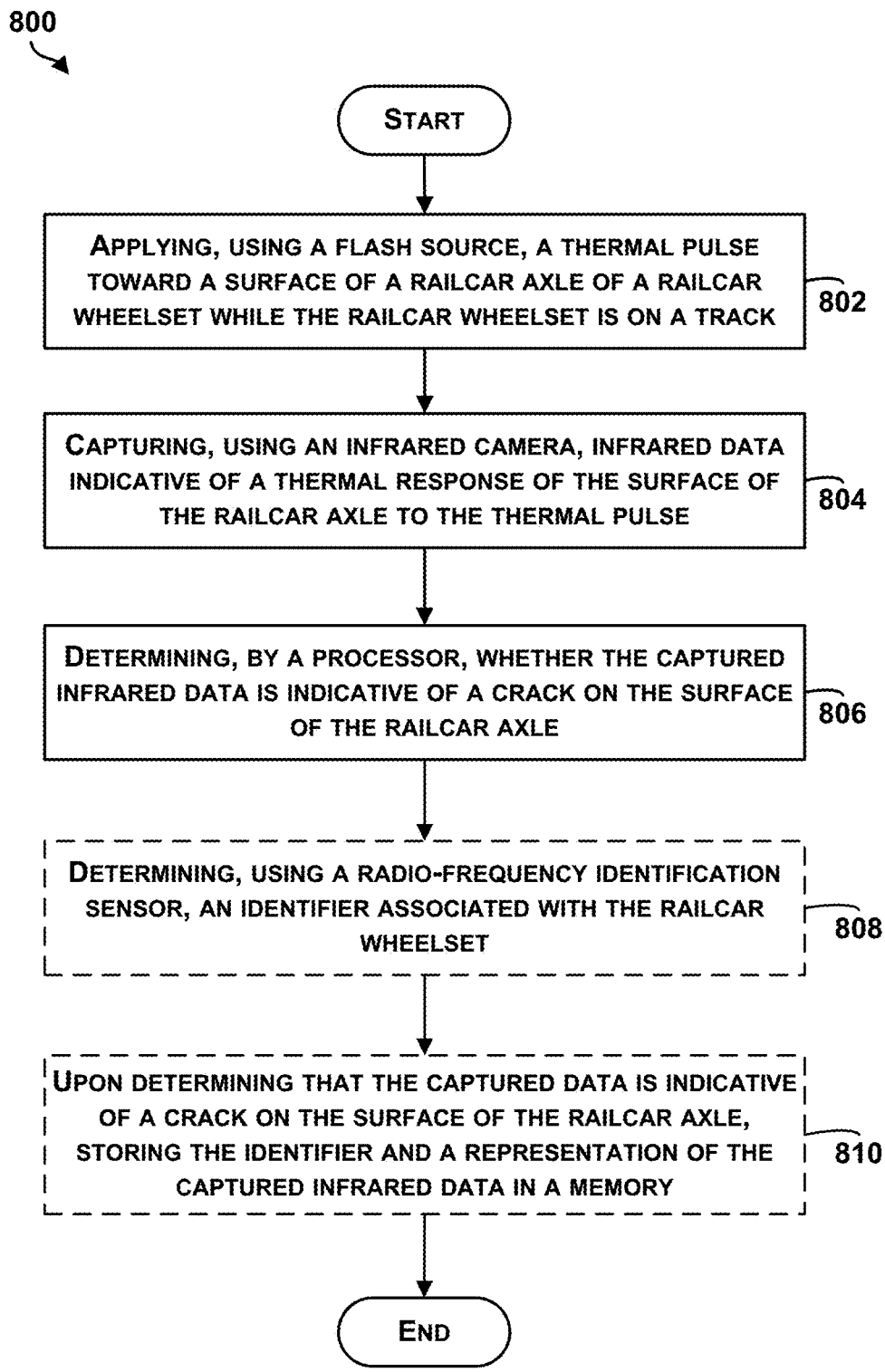
FIG. 8 shows a flowchart of an example method of inspecting railcar axles, according to an example embodiment.

FIG. 8 is a flowchart of an example method 800 for inspecting railcar axles. Method 800 shown in FIG. 8 presents an embodiment of a method that, for example, could be used with the system shown in FIG. 1, for example, or any of the systems disclosed herein. Example devices or systems may be used or configured to perform logical functions presented in FIG. 8. Method 800 may include one or more operations, functions, or actions as illustrated by one or more of blocks 802-810. Although these blocks are illustrated in a sequential order, these blocks may also be performed in parallel, and/or in a different order than those described herein. Also, the various blocks may be combined into fewer blocks, divided into additional blocks, and/or removed based upon the desired implementation.

Initially, at block 802, the method 800 includes applying, using a flash source, a thermal pulse toward a surface of a railcar axle of a railcar wheelset, while the railcar wheelset is on a track. By way of example, a flash source, such as flash source 106 of FIG. 1, can convert energy stored in a capacitor or bank of capacitors into the thermal pulse. The flash source can be positioned beneath a height at which the railcar axle rotates above the crack. The flash source can apply the thermal pulse, while the railcar wheelset is rolling on the track.

At block 804, the method 800 includes capturing, using an infrared camera, infrared data indicative of a thermal response of the surface of the railcar axle to the thermal pulse. The thermal response could include changes in temperature on the surface of the railcar axle over time. In one example, an infrared camera, such as infrared camera 108 of FIG. 1, could capture one or more images before the thermal pulse is applied and one or more images after the thermal pulse is applied. The captured images could be indicative of the thermal response during a brief window of time, such as a few microseconds or tens of microseconds.

At block 806, the method 800 includes determining, by a processor, whether the captured infrared data is indicative of a crack on the surface of the railcar axle. In one example, a processor, such as processor 112 of FIG. 1, could analyze infrared images captured by the infrared camera to search for areas on the surface that are cooler relative to surrounding areas of the surface. For instance, the processor could search for areas that are, for example, a tenth of a degree cooler, one-half of a degree cooler, or one degree cooler than surrounding areas on the surface. Identifying these areas could involve pre-processing the images to enhance the contrast of temperature differentials on the surface. In another example, the processor could use machine learning techniques to determine whether the captured infrared data is indicative of a crack on the surface of railcar axle. For instance, a machine learning model could be developed using a training set that includes images of thermal responses of surfaces of railcar axles that include cracks. The processor could use the machine learning model to analyze the captured infrared data and assess whether or not the captured infrared data is indicative of a crack on the surface of railcar axle.

Optionally, at block 808, the method 800 includes determining, using an RFID reader, an identifier associated with the railcar wheelset. For instance, an RFID tag could be attached to the railcar wheelset or attached to a railcar including the railcar wheelset, and an RFID reader, such as RFID reader 116 of FIG. 1, could be configured to identify an identification code stored by the RFID tag.

Optionally, at block 810, the method 800 includes, upon determining that the captured data is indicative of a crack on the surface of the railcar axle, storing the identifier and a representation of the captured infrared data in a memory. The representation of the captured infrared data could include the captured infrared data itself, such as one or more infrared images. Additionally or alternatively, the representation of the captured infrared data could include a processed version of the captured infrared data, such as temperature derivatives calculated from a sequence of infrared images. Storing the representation of the captured infrared data in the memory allows an operator to subsequently review the data and, for example, decide whether an inspector should perform a further inspection of the railcar axle for cracks.

The identifier and/or the representation of the captured infrared data could also be presented to an operator, and then operator could then decide to order replacement parts after reviewing the identifier and/or the representation of the captured infrared data. Additionally or alternatively, after receiving the identifier, the operator could schedule a maintenance operation for the railcar axle. The maintenance operation could include an inspection or a removal of the railcar axle (and optionally the railcar wheelset) from service.

Figure 9:
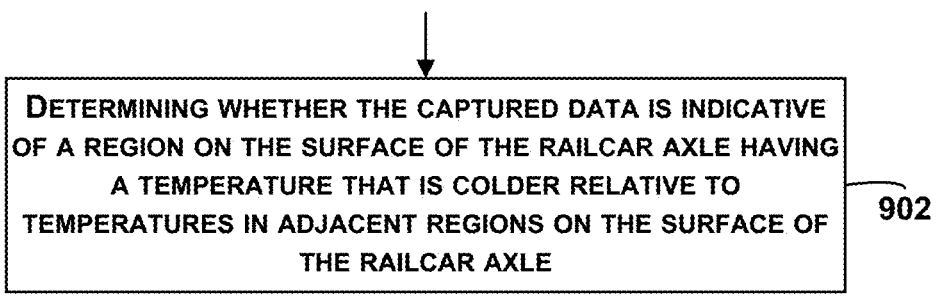
FIG. 9 shows an additional operation for use with the method shown in FIG. 8, according to an example embodiment.

FIG. 9 shows an additional operation for use with the method 800 shown in FIG. 8. Block 902 of FIG. 9 could be performed as part of the determining whether the captured data is indicative of a crack on the surface of the railcar axle at block 802 of FIG. 8. At block 902, FIG. 9 includes determining whether the captured data is indicative of a region on the surface of the railcar axle having a temperature that is colder relative to temperatures in adjacent regions on the surface of the railcar axle. In one example, a processor, such as processor 112 of FIG. 1, could search for a region on the surface of the railcar axle that, in multiple infrared images, has a temperature that is colder relative to temperatures in adjacent regions of the railcar axle.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system for inspecting railcar axles, comprising:
a flash source configured to apply a thermal pulse toward a surface of a railcar axle of a railcar wheelset while the railcar wheelset is on a track;
an infrared camera configured to capture infrared data indicative of a thermal response of the surface of the railcar axle to the thermal pulse;
a trigger sensor configured to trigger the flash source to apply the thermal pulse based on a position of the railcar wheelset on the track; and
a protective chamber that encapsulates the flash source and the infrared camera, wherein the protective chamber comprises:
an infrared transparent window through which the flash source is configured to apply the thermal pulse and the infrared camera is configured to capture the infrared data,
a protective film configured to cover an exterior surface of the infrared transparent window, and
a pair of adjustable rollers configured to adjust which segment of the protective film covers the exterior surface of the infrared transparent window.

2. The system of claim 1, wherein the trigger sensor is further configured to trigger the infrared camera to capture the infrared data based on the position of the railcar wheelset on the track.

3. The system of claim 1, further comprising a processor configured to determine whether the captured infrared data is indicative of a crack on the surface of the railcar axle.

4. The system of claim 3, further comprising a radio-frequency identification reader configured to determine an identifier associated with the railcar wheelset, wherein the processor is configured to store the identifier in a memory upon determining that the captured infrared data is indicative of a crack on the surface of the railcar axle.

5. The system of claim 1, wherein the flash source and the infrared camera are positioned beneath a height at which the railcar axle rotates above the track.

6. The system of claim 1, wherein the flash source is configured to apply the thermal pulse while the railcar wheelset is rolling on the track, and wherein the infrared camera is configured to capture the infrared data while the railcar wheelset is rolling on the track.

7. The system of claim 6, wherein the flash source is configured to apply the thermal pulse while the railcar wheelset is rolling on the track, and wherein the infrared camera is configured to capture the infrared data while the railcar wheelset is rolling on the track at a speed of greater than five miles per hour.

8. The system of claim 1, wherein the trigger sensor comprises a proximity sensor.

9. The system of claim 1, further comprising a vision camera configured to capture an image of the surface of the railcar axle and store the image of the surface of the railcar axle in a memory.

10. A system for inspecting railcar axles, comprising:
a flash source configured to apply a thermal pulse toward a surface of a railcar axle of a railcar wheelset while the railcar wheelset is on a track;
an infrared camera configured to capture infrared data indicative of a thermal response of the surface of the railcar axle to the thermal pulse;
a trigger sensor configured to trigger the flash source to apply the thermal pulse based on a position of the railcar wheelset on the track;
a marking tool; and
a processor configured to:
determine whether the captured infrared data is indicative of a crack on the surface of the railcar axle, and
cause the marking tool to apply a visible marking to the railcar wheelset upon determining that the captured infrared data is indicative of a crack on the surface of the railcar axle.

11. The system of claim 10 further comprising a protective chamber that encapsulates the flash source and the infrared camera, wherein the protective chamber comprises an infrared transparent window through which the flash source is configured to apply the thermal pulse and the infrared camera is configured to capture the infrared data.

12. The system of claim 11, wherein the protective chamber further comprises:
a protective film configured to cover an exterior surface of the infrared transparent window; and
a pair of adjustable rollers configured to adjust which segment of the protective film covers the exterior surface of the infrared transparent window.

13. A system for inspecting railcar axles, comprising:
a plurality of flash infrared thermography (IRT) units positioned along a track, each flash IRT unit of the plurality of flash IRT units comprising a flash source and an infrared camera, wherein each flash IRT unit of the plurality of flash IRT units is positioned at a respective position and configured to capture infrared data indicative of a surface of a respective sector of a railcar axle of a railcar wheelset; and
a processor configured to determine whether any of the captured infrared data is indicative of a crack on the surface of any sectors of the railcar axle.

14. The system of claim 13, wherein the plurality of flash IRT units comprise:

a first flash IRT unit configured to capture infrared data indicative of a surface of a first sector of the railcar axle; and
a second flash IRT unit configured to capture infrared data indicative of a surface of a second sector of the railcar axle after the first flash IRT unit captures the infrared data indicative of the surface of the first sector of the railcar axle and the railcar axle rotates.

15. The system of claim 13, wherein the plurality of flash IRT units comprise:
a first flash IRT unit configured to capture infrared data indicative of a surface of a first sector of the railcar axle; and
a second flash IRT unit configured to capture infrared data indicative of a surface of a second sector of the railcar axle while the first flash IRT unit captures the infrared data indicative of the surface of the first sector of the railcar axle.

16. The system of claim 13, further comprising at least one trigger sensor configured to trigger the plurality of flash IRT units to capture the infrared data indicative of surfaces of the sectors of the railcar axle based on a position of the railcar wheelset on the track.

17. The system of claim 13, wherein each flash IRT unit of the plurality of flash IRT units is configured to capture infrared data indicative of a surface of a respective sector of the railcar axle while the railcar wheelset is rolling on the track.

18. A method of inspecting railcar axles, comprising:
applying, using a flash source, a thermal pulse toward a surface of a railcar axle of a railcar wheelset while the railcar wheelset is on a track;
capturing, using an infrared camera, infrared data indicative of a thermal response of the surface of the railcar axle to the thermal pulse;
determining, by a processor, whether the captured infrared data is indicative of a crack on the surface of the railcar axle; and
causing, by the processor, a marking tool to apply a visible marking to the railcar wheelset upon determining that the captured infrared data is indicative of a crack on the surface of the railcar axle.

19. The method of claim 18, further comprising:
determining, using a radio-frequency identification reader, an identifier associated with the railcar wheelset; and
upon determining that the captured infrared data is indicative of a crack on the surface of the railcar axle, storing the identifier and a representation of the captured infrared data in a memory.

20. The method of claim 18, wherein the thermal response comprises changes in temperature on the surface of the railcar axle over time, and wherein determining whether the captured infrared data is indicative of a crack on the surface of the railcar axle comprises determining whether the captured infrared data is indicative of a region on the surface of the railcar axle having a temperature that is colder relative to temperatures in adjacent regions on the surface of the railcar axle.

* * * * *